United States Patent
Utsugi (10) Patent No.: US 8,284,278 B2
(45) Date of Patent: Oct. 9, 2012

(54) IMAGE PROCESSING APPARATUS, IMAGING APPARATUS, METHOD OF CORRECTION COEFFICIENT CALCULATION, AND STORAGE MEDIUM STORING IMAGE PROCESSING PROGRAM

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 314 days.

(21) Appl. No.: 12/808,817

(22) PCT Filed: Jan. 27, 2009

(86) PCT No.: PCT/JP2009/000307
§ 371 (c)(1),
(2), (4) Date: Jun. 17, 2010

(87) PCT Pub. No.: WO2009/101767
PCT Pub. Date: Aug. 20, 2009

(65) Prior Publication Data
US 2010/0277625 A1    Nov. 4, 2010

(30) Foreign Application Priority Data

Feb. 14, 2008 (JP) ................................. 2008-033511
May 21, 2008 (JP) ................................. 2008-132920

(51) Int. Cl.
*H04N 9/64* (2006.01)
(52) U.S. Cl. ........................................ 348/247; 348/349
(58) Field of Classification Search .................. 348/241, 348/246, 247, 345, 349
See application file for complete search history.

(56) References Cited

U.S. PATENT DOCUMENTS

| 6,829,008 | B1 | 12/2004 | Kondo et al. | |
|---|---|---|---|---|
| 7,853,097 | B2 * | 12/2010 | Ishiga | 382/275 |
| 2003/0011693 | A1 | 1/2003 | Oda | |
| 2004/0150731 | A1 | 8/2004 | Hara | |
| 2005/0219390 | A1 | 10/2005 | Tajima et al. | |
| 2007/0009172 | A1 | 1/2007 | Wu | |
| 2007/0237429 | A1 | 10/2007 | Kusaka | |
| 2007/0237512 | A1 | 10/2007 | Kusaka | |
| 2011/0149123 | A1* | 6/2011 | Matsuoka | 348/247 |
| 2012/0133805 | A1* | 5/2012 | Ohwa | 348/246 |

FOREIGN PATENT DOCUMENTS

| JP | A-62-029395 | 2/1987 |
|---|---|---|
| JP | A-2000-156823 | 6/2000 |
| JP | A-2007-279597 | 10/2007 |
| JP | A-2007-282109 | 10/2007 |

OTHER PUBLICATIONS

Extended European Search Report issued in European Patent Application No. 09710403.8 dated Jun. 8, 2011.
International Search Report issued on May 19, 2009 in International Application No. PCT/JP2009/000307 (with translation).

* cited by examiner

*Primary Examiner* — Tuan Ho
(74) *Attorney, Agent, or Firm* — Oliff & Berridge, PLC (57) ABSTRACT

An image processing apparatus includes a location information storing section, a correction coefficient storing section, a correction object pixel location setting section, a correction object pixel data extracting section, an other-color pixel data extracting section, and a pixel data correcting section.

12 Claims, 4 Drawing Sheets

| G11 | B12 | G13 | B14 | G15 | B16 | G17 |
|-----|-----|-----|-----|-----|-----|-----|
| R21 | G22 | R23 | G24 | R25 | G26 | R27 |
| G31 | B32 | G33 | B34 | G35 | B36 | G37 |
| R41 | G42 | R43 | G44 | R45 | G46 | R47 |
| X51 | Y52 | X53 | Y54 | X55 | Y56 | X57 |
| R61 | G62 | R63 | G64 | R65 | G66 | R67 |
| G71 | B72 | G73 | B74 | G75 | B76 | G77 |
| R81 | G82 | R83 | G84 | R85 | G86 | R87 |
| G91 | B92 | G93 | B94 | G95 | B96 | G97 |

IMAGE PROCESSING APPARATUS, IMAGING APPARATUS, METHOD OF CORRECTION COEFFICIENT CALCULATION, AND STORAGE MEDIUM STORING IMAGE PROCESSING PROGRAM

CROSS-REFERENCE TO RELATED APPLICATIONS

This application is a U.S. National Stage application claiming the benefit of prior filed International Application Number PCT/JP2009/000307, filed Jan. 27, 2009, in which the International Application claims priorities from Japanese Application Numbers 2008-033511 (filed on Feb. 14, 2008) and 2008-132920 (filed on May 21, 2008), the entire contents of which are incorporated herein by reference.

TECHNICAL FIELD

The present application relates to an image processing apparatus, an imaging apparatus, a method of a correction coefficient calculation and an image processing program.

BACKGROUND ART

An imaging apparatus is known including an image sensor in which imaging pixels and focus detection pixels are disposed in a mixed state on the same substrate, capturing a subject image formed by an imaging lens on the image sensor, and detecting a focusing state of the image (for example, Patent Document 1). Any of color filters in R (red), G (green) or B (blue) is equipped on each imaging pixel so as to be a pattern in Bayer array type. On the other hand, a white filter is equipped on the focus detection pixel so that a focus detection can be done for a subject in any color. Accordingly, a pixel value in accordance with a normal color filter cannot be acquired at a location of the focus detection pixel in an image data captured by the above-stated imaging apparatus. A method interpolating a pixel value for imaging at the location of the focus detection pixel is proposed in the Patent Document 1 and so on by using a pixel value of an imaging pixel in a vicinity of the focus detection pixel. Patent Document 1: Japanese Unexamined Patent Application Publication No. 2007-282109

DISCLOSURE

Problems to be Solved

However, the present inventor found out that some error occurs in a spectroscopic characteristic of the color filter of the imaging pixel in the vicinity of the focus detection pixel affected by a process to make the filter of the focus detection pixel white. Accordingly, there is a problem that an unnatural band-shaped structure occurs in a photographed image caused by the error of the color filter only by correcting the pixel value at the focus detection pixel location by the publicly known method in the Patent Document 1 and so on.

In consideration of the above-stated problems in the conventional art, a proposition of the present application is to provide an art capable of correcting a defect in a photographed image resulting from an error in a color filter of an imaging pixel.

Means for Solving the Problems

To solve the above-stated problems, an image processing apparatus includes a location information storing section storing location information of an imaging pixel having a trouble in a color filter among a plurality of imaging pixels of an image sensor in which the imaging pixels are two-dimensionally arranged and have color filters in plurality of colors, a correction coefficient storing section storing a correction coefficient which corrects a pixel value of the imaging pixel having the trouble, a correction object pixel location setting section setting a location of a correction object pixel by using the location information, a correction object pixel data extracting section extracting a pixel value of the correction object pixel, an other-color pixel data extracting section extracting an other-color pixel value being a pixel value of an imaging pixel which exists in a vicinity of the correction object pixel and whose color is different from the color of the color filter of the correction object pixel, and a pixel data correcting section correcting the pixel value of the correction object pixel by calculating a weighted sum of the pixel value of the correction object pixel and the other-color pixel value by using the correction coefficient.

Besides, an area of the image sensor includes a part being a focus detection pixel whose spectroscopic characteristic is different from the spectroscopic characteristic of the imaging pixel, the location information storing section stores location information of the focus detection pixel, the correction coefficient stored in the correction coefficient storing section is a coefficient in accordance with a distance from the focus detection pixel, and the correction object pixel location setting section may set locations of imaging pixels in a vicinity of the focus detection pixel as the location of the correction object pixel.

The image processing apparatus may further includes an imaging pixel data estimating section interpolating a pixel value for imaging at the location of the focus detection pixel by using the pixel value of the correction object pixel corrected by the pixel data correcting section.

An imaging apparatus includes an image sensor and the image processing apparatus.

A correction coefficient calculation method calculating the correction coefficient stored in the correction coefficient storing section of the image processing apparatus includes an inspection image generating operation generating a plurality of inspection images by irradiating a plurality of inspection lights to the image sensor, the inspection lights having different spectroscopic characteristics, an inspection object pixel location setting operation setting a location of the imaging pixel having the trouble as a location of an inspection object pixel, an inspection object pixel data extracting operation extracting a pixel value of the imaging pixel having the trouble as an inspection object pixel value, an other-color pixel data extracting operation extracting an other-color pixel value being a pixel value of an imaging pixel which exists in a vicinity of the location of the inspection object pixel and whose color is different from the color of the color filter of the inspection object pixel, a normal pixel data generating operation extracting a pixel value of an imaging pixel as a normal pixel value, the imaging pixel having the color filter of the same color as the inspection object pixel and of which color filter is normal, and a weighted coefficient generating operation calculating a weighted coefficient approximating to the normal pixel value as a coefficient common to the plurality of inspection images by calculating a weighted sum of the inspection object pixel value and the other-color pixel value.

An image processing program enables processes of the image processing apparatus on a computer.

According to the present application, it is possible to correct a defect of a photographed image resulting from a trouble of a color filter of an imaging pixel.

DETAILED DESCRIPTION OF THE EMBODIMENTS

Figure 1:
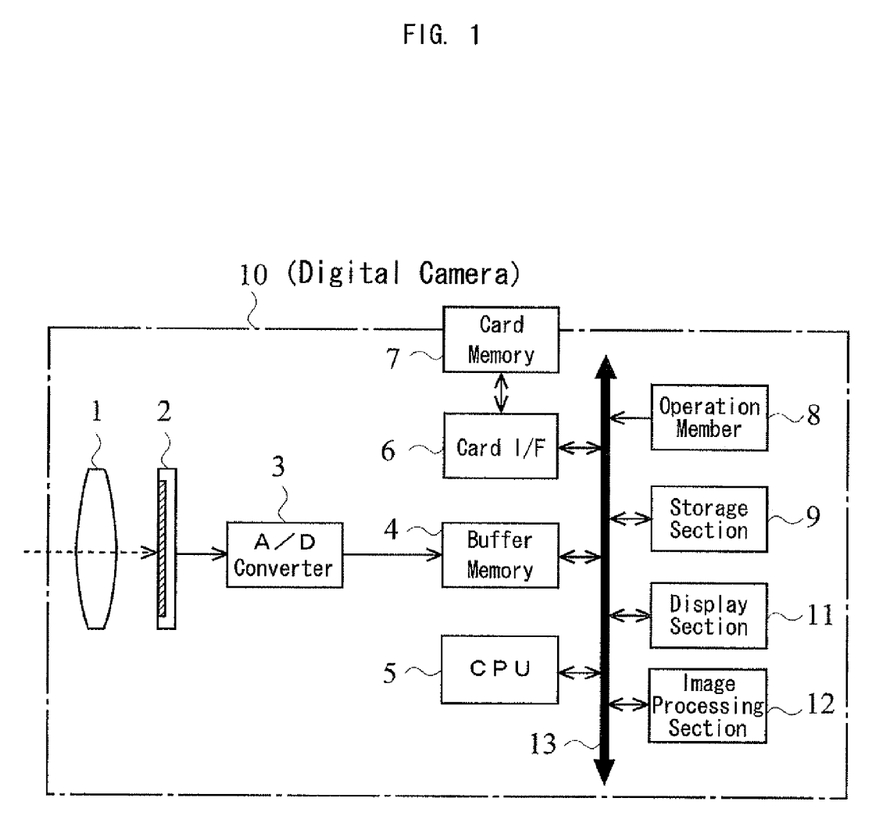
FIG. 1 is a block diagram illustrating a configuration of an electronic camera 10 according to an embodiment.

FIG. 1 is a configuration chart of an electronic camera 10 according to an embodiment of the present invention.

The electronic camera 10 is made up of an imaging lens 1, an image sensor 2, an A/D converter 3, a buffer memory 4, a CPU 5, a card interface (card I/F) 6, an operation member 8, a storage section 9, a display section 11 and an image processing section 12. The buffer memory 4, the CPU 5, the card I/F 6, the operation member 8, the storage section 9, the display section 11 and the image processing section 12 are coupled via a bus 13 so as to be able to communicate with each other. Note that FIG. 1 illustrates only a main part of the electronic camera 10. For example, a timing generator and so on generating a timing pulse of a photographing instruction to the image sensor 2 and the A/D converter 3 in accordance with an instruction of the CPU 5 are not illustrated in FIG. 1.

The imaging lens 1 is made up of plural optical lenses, and forms a subject image on a light-receiving surface of the image sensor 2.

Figure 2:
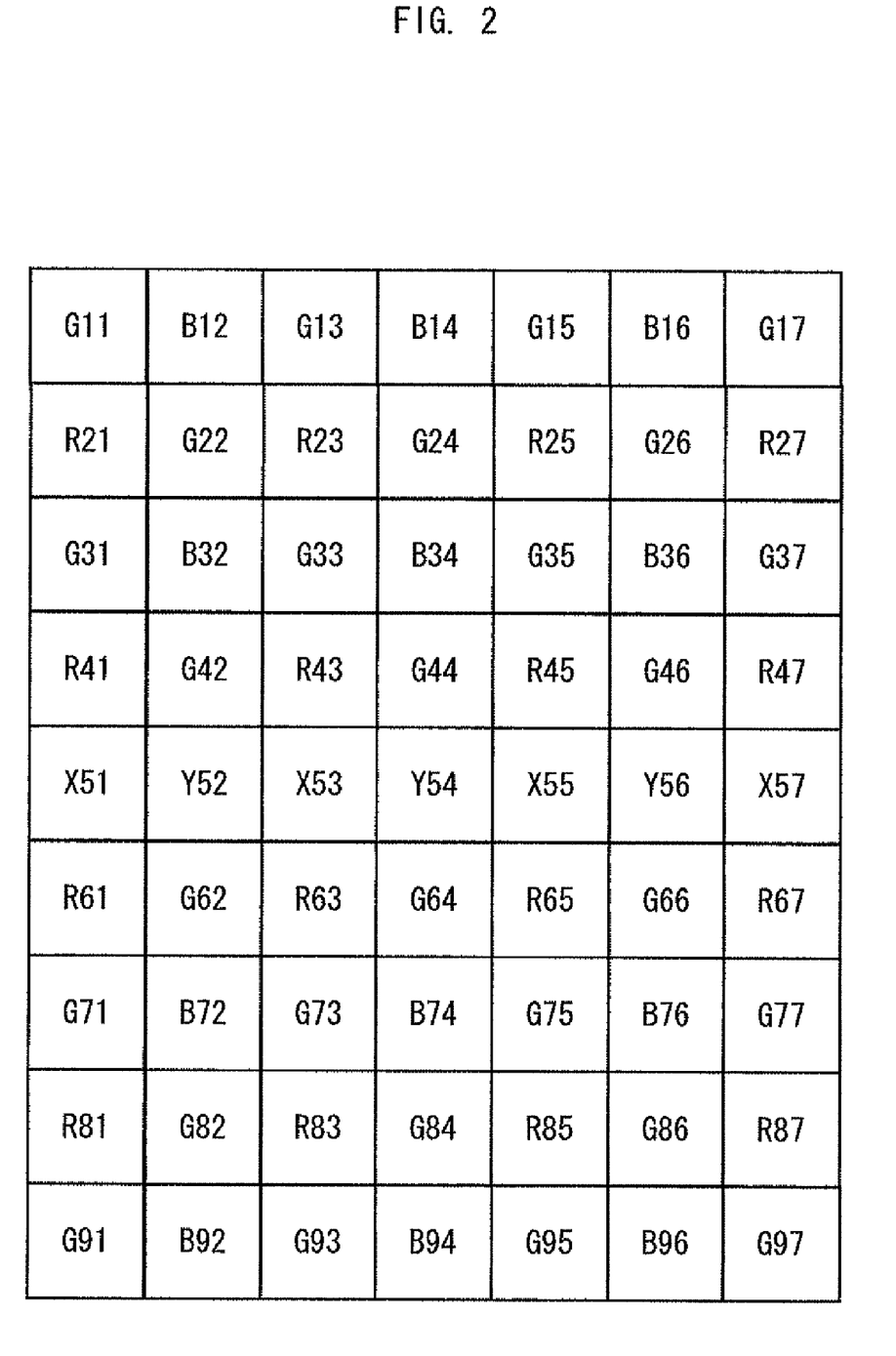
FIG. 2 is a view illustrating an arrangement of cells of an image sensor.

CCD and CMOS semiconductor image sensors and so on in which any of color filters in R (red), G (green) or B (blue) are provided in Bayer array type for each of plural imaging pixels arranged on the light-receiving surface can be accordingly selected and used for the image sensor 2. Further, the image sensor 2 of the present embodiment has plural focus detection pixels (AF pixel) one-dimensionally disposed in a horizontal scanning direction at a part of an area on the light-receiving surface. A white filter is equipped on each of the AF pixels, and there are two kinds of AF pixels each receiving a luminous flux transmitting through a pupil of an optical system of the imaging lens 1 at a left side or a right side. Namely, each of the AF pixels outputs detection signals being pupil split at the left side or the right side in accordance with luminance of white light. FIG. 2 illustrates a part of an image data centering on an area where the AF pixels are disposed among an image data captured by the image sensor 2. Each cell represents one pixel. First symbols R, G and B of the respective cells represent the imaging pixels having respective color filters. On the other hand, symbols X and Y represent the AF pixels each having sensitivity to the luminous flux from the left side or the right side, and they are alternately and one-dimensionally arranged in the horizontal scanning direction. Two-digit numbers subsequent to these symbols represent locations of the pixels.

The image sensor 2 operates based on the timing pulse generated by the timing generator (not-illustrated) receiving the instruction of the CPU 5, and acquires a subject image formed by the imaging lens 1 provided at a front side thereof. An image signal output from the image sensor 2 is converted into a digital signal by the A/D converter 3. The digital image signal is temporary recorded to a frame memory (not-illustrated), and thereafter, recorded to the buffer memory 4. Incidentally, an arbitrary nonvolatile memory from among semiconductor memories can be accordingly selected and used for the buffer memory 4.

The CPU 5 reads a control program and an image processing program stored in the storage section 9 and initializes the electronic camera 10 when a power of the electronic camera 10 is turned on by a power button operation of the operation member 8 by a user. The CPU 5 outputs an imaging instruction of a subject to the timing generate (not-illustrated) based on the control program, makes the image processing section 12 perform the image processing of the captured image based on the image processing program, and performs controls to record to the card memory 7, to display on the display section 11 and so on, when instructions from the user are received by the operation member 8. A CPU of a general computer can be used for the CPU 5.

The card memory 7 is detachably equipped on the card I/F 6. The image recorded to the buffer memory 4 is recorded to the card memory 7 as a file in JPEG format, YUV format and so on after image processed by the image processing section 12 based on the instruction of the CPU 5.

The operation member 8 outputs operation signals to the CPU 5 in accordance with contents of operations of members by the user. For example, operation members such as a power button, a mode setting button for a photographing mode and so on, and a release button are included in the operation member 8. Note that the operation member 8 may be a button in touch panel format provided at a front surface of a screen of the later-described display section 11.

The storage section 9 records the image data captured by the electronic camera 10, and stores various programs and so on such as the control program to control the electronic camera 10 by the CPU 5, the image processing program executed by the image processing section 12. Further, the storage section 9 also stores location information of the AF pixels of the image sensor 2, a data of a correction coefficient and so on asked in advance used by the image processing program. The programs and data stored in the storage section 9 can be accordingly referred to from the CPU 5 via the bus 13. A memory device such as a general hard-disk device, a magnetic optical disk device can be accordingly selected and used for the storage section 9.

The display section 11 displays a through image, a photographed image, a mode setting screen, or the like. A liquid crystal display and so on can be accordingly selected and used for the display section 11.

The image processing section 12 is a digital front-end circuit performing the image processing such as edge enhancement processing and white balance correction, and an interpolation calculation of an imaging pixel value at a pixel location of the AF pixel based on the instruction for the image processing by the CPU 5.

Figure 3:
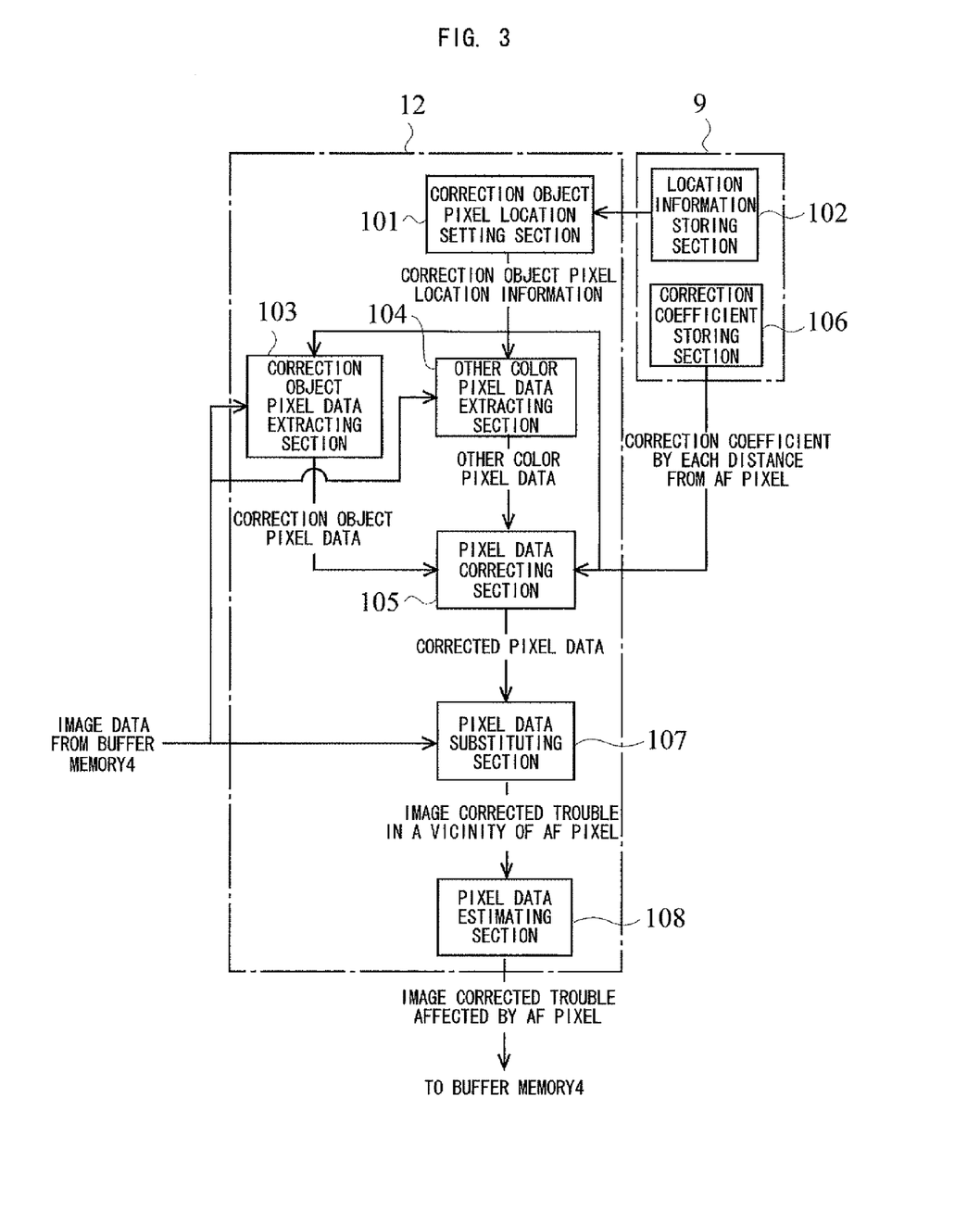
FIG. 3 is a view illustrating a flow of an image data between a storage section 9 and an image processing section 12 of the electronic camera 10.
Figure 4:
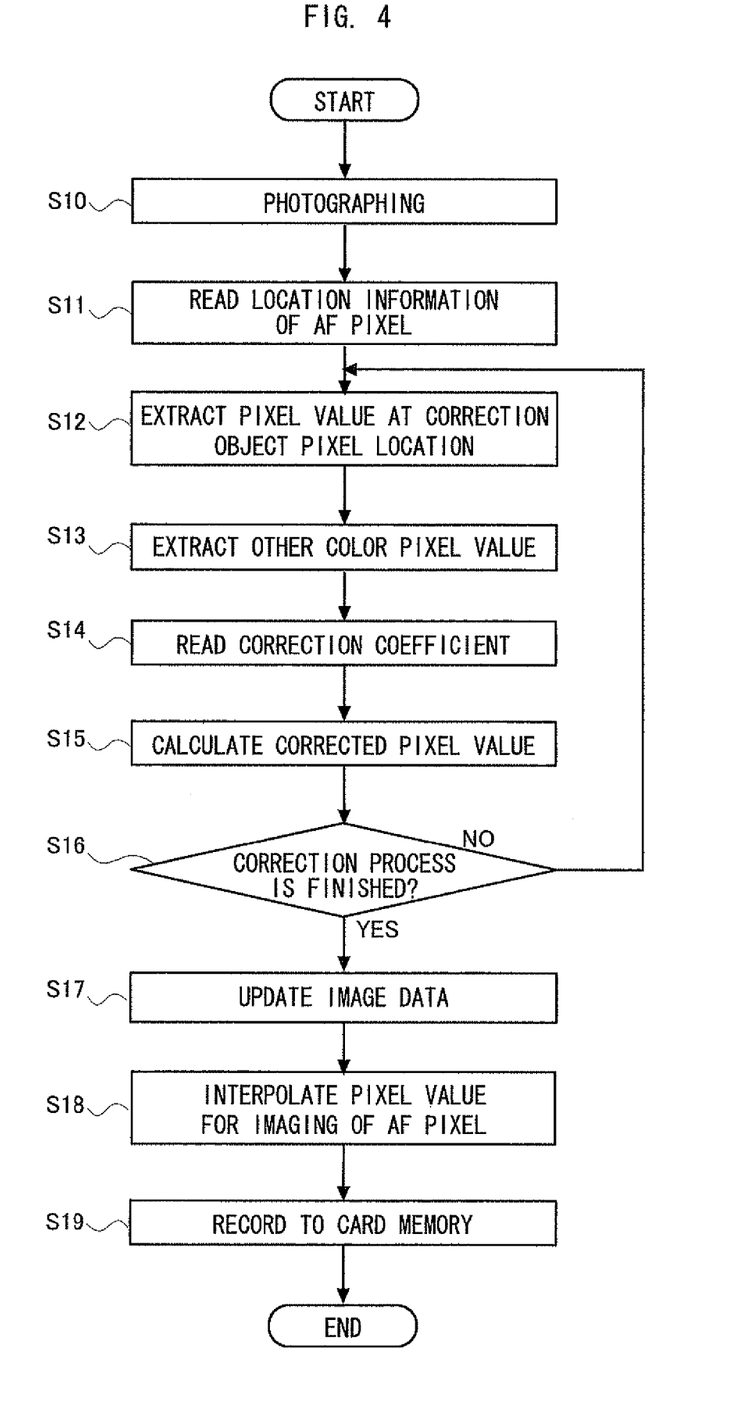
FIG. 4 is a flowchart of image processing in the electronic camera 10 of the present embodiment.

Next, the electronic camera 10 according to the present embodiment is described with reference to a flow of the image data at the storage section 9 and the image processing section 12 based on the CPU 5 in FIG. 3 and a flowchart of the image processing in FIG. 4.

When the power button of the operation member 8 is pressed by the user, the CPU 5 reads the control program and the image processing program stored in the storage section 9 of the electronic camera 10, and initializes the electronic camera 10. The CPU 5 waits until the imaging instruction of the subject is issued from the user. When the release button of the operation member 8 is pressed by the user, the CPU 5 judges that the imaging instruction is issued, and performs processes from step S10 to step S19. Incidentally, the imaging pixel value of green (G) is interpolated at a location of the AF pixel with the symbol "X", and an imaging pixel value of blue (B) is interpolated at a pixel location of the AF pixel with the symbol "Y" because the color filters equipped on the respective imaging pixels are in Bayer array pattern in the present embodiment. In the following description, it is assumed that an area of three pixels width in one side centering on an AF pixel row is an area where there is an error in the spectroscopic characteristic of the color filter of the image sensor 2, in the present embodiment.

Step S10: The CPU 5 issues the imaging instruction for the timing generator (not-illustrated). The timing generator (not-illustrated) generates the timing pulse to the image sensor 2, and the image sensor 2 captures the image of the subject formed by the imaging lens 1. The captured image data is recorded to the buffer memory 4 via the A/D converter 3. The CPU 5 issues an instruction for the buffer memory 4 to transfer the image data to the image processing section 12. The buffer memory 4 transfers the image data photographed at the step S10 to the image processing section 12 via the bus 13.

Step S11: A correction object pixel location setting section 101 of the image processing section 12 reads AF pixel location information from a location information storing section 102 of the storage section 9. Here, a coordinate V in a vertical scanning direction and coordinates H1, H2 being a start point and an end point in the horizontal scanning direction of the AF pixel row are stored in the location information storing section 102. Note that H1, H2 are the coordinates of a row where there are the imaging pixels of R in the vertical scanning direction. The correction object pixel location setting section 101 sets locations of imaging pixels existing within a range of three pixels from the AF pixel row as a correction object pixel location while sequentially shifting the coordinates from H1 to H2 in the horizontal scanning direction of the correction object pixels by two pixels regarding the focus detection pixels pupil splitting at the left side and the right side as a pair. For example, when a pair of AF pixel row is X51 and Y52, the correction object pixel location setting section 101 sets the locations of the imaging pixels of R21, G31, R41, G22, B32, G42, R61, G71, R81, G62, B72 and G82 as the correction object pixel location. Next, the correction object pixel location setting section 101 sets the locations of the imaging pixels of R23, G33, R43, G24, B34 G44, R63, G73, R83, G64, B74 and G84 as the correction object pixel location for a pair of AF pixel row of X53 and Y54.

Step S12: A correction object pixel data extracting section 103 of the image processing section 12 extracts a pixel value of the correction object pixel location set by the correction object pixel location setting section 101 at the step S11.

Step S13: An other color pixel data extracting section 104 of the image processing section 12 asks an other color pixel value of a color different from the correction object pixel from an average value of the pixel values of adjacent imaging pixels to correct the correction object pixel. For example, the other color pixel values G (x1, y1+1) and B (x1, y1+1) are asked by the following expression (1) to correct a pixel value R (x1, y1+1) of the imaging pixel R43 being the correction object pixel. Note that a coordinate (x1, y1) represents a coordinate of the AF pixel X53.

$$G(x1,y1+1)=(G(x1-1,y1+1)+G(x1+1,y1+1)+G((x1,y1+2))/3$$

$$B(x1,y1+1)=(B((x-1,y1+2)+B(x1+1,y1+2))/2 \quad (1)$$

The other color pixel values are similarly extracted as for the other correction object pixels.

Step S14: A pixel data correcting section 105 of the image processing section 12 reads a correction coefficient from a correction coefficient storing section 106 of the storage section 9. Kinds of the correction coefficients in the present embodiment are as follows.

Correction coefficients of an R pixel existing at a distance of one pixel from an AF pixel (kR1_R, kR1_G, kR1_B)

Correction coefficients of a G pixel existing at a distance of one pixel from an AF pixel (kG1_R, kG1_G, kG1_B)

Correction coefficients of a B pixel existing at a distance of two pixels from an AF pixel (kB2_R, kB2_G, kB2_B)

Correction coefficients of a G pixel existing at a distance of two pixels from an AF pixel (kG2_R, kG2_G, kG2_B)

Correction coefficients of an R pixel existing at a distance of three pixels from an AF pixel (kR3_R, kR3_G, kR3_B)

Correction coefficients of a G pixel existing at a distance of three pixels from an AF pixel (kG3_R, kG3_G, kG3_B)

Values of the correction coefficients are different depending on characteristics of color filters in a vicinity of the AF pixel, but for example, they have values such as stated below.

$$(kR1\_R, kR1\_G, kR1\_B)=(0.015, 0.011, 0.012)$$

Note that the same correction coefficients may be used for the imaging pixel of which distance from the AF pixel row is the same and the color is the same, when the characteristics of the color filters in the vicinity of the AF pixel do not much depend on an arranging direction of the AF pixel row (horizontal scanning direction). On the other hand, when the characteristics of the color filters in the vicinity of the AF pixel largely depend on the coordinate in the horizontal scanning direction, it is necessary to use the value of the correction coefficient in accordance with the coordinate in the horizontal scanning direction. Note that a calculation method of the correction coefficient is described later.

Step S15: The pixel data correcting section 105 of the image processing section 12 calculates pixel values corrected at each of the correction object pixel locations by using the other color pixel values asked at the step S13. For example, when the pixel values at the imaging pixels R23, G33, R43, G24, B34, G44, R63, G73, R83, G64, B74 and G84 are represented by using the above-stated coordinate (x1, y1) of X53, they are R (x1, y1+3), G (x1, y1+2), R (x1, y1+1), G (x1+1, y1+3), B (x1+1, y1+2), G (x1+1, y1+1), R (x1, y1−1), G (x1, y1−2), G (x1, y1−3), G (x1+1, y1−1), B (x1+1, y1−2) and G (x1+1, y1−3). When the corrected pixel values are set as R'(x1, y1+3), G'(x1, y1+2), R'(x1, y1+1), G'(x1+1, y1+3), B'(x1+1, y1+2), G'(x1+1, y1+1), R'(x1, y1−1), G (x1, y1−2), G'(x1, y1−3), G'(x1+1, y1−1), B'(x1+1, y1−2) and G'(x1+1, y1−3), for example, the corrected pixel values at the imaging pixels R43, B34, G24 are each calculated as the following expressions (2) to (4) by using the correction coefficients.

$$R'(x1,y1+1)=R(x1,y1+1)+kR1\_R \times R(x1,y1+1)+kR1\_G \times G(x1,y1+1)+kR1\_B \times B(x1,y1+1) \quad (2)$$

$$B'(x1+1,y1+2)=(x1+1,y1+2)+kB2\_R \times R(x1+1,y1+2)+kB2\_G \times G(x1+1,y1+2)+kB2\_B \times B(x1+1,y1+2) \quad (3)$$

$$G'(x1+1,y1+3)=G(x1+1,y1+3)+kB3\_R \times R(x1,y1+3)+kB3\_G \times G(x1+1,y1+3)+kB3\_B \times B(x1+1,y1+3) \quad (4)$$

The corrected pixel values as for the other pixel values are asked similarly.

Step S16: The image processing section 12 judges whether or not all of the corrections of the correction object pixels are performed. The image processing section 12 transfers to step S17 (YES side) when the correction processes for all of the correction object pixels are performed. When the correction processes are not finished, the image processing section 12 transfers to the step S12 (NO side). The image processing section 12 performs the processes from the step S12 to the step S15 for the correction object pixels existing in the vicinity of the next pair of AF pixel row.

Step S17: A pixel data substituting section 107 of the image processing section 12 updates the image data while using the corrected pixel values asked at the step S15 as the pixel values of the correction object pixels.

Step S18: A pixel data estimating section 108 of the image processing section 12 calculates a pixel value for imaging at the location of the AF pixel in the corrected image data by using, for example, a publicly known method described in the Patent Document 1 and so on, and generates an image data of which error resulting from an effect of the AF pixel is corrected. The image processing section 12 performs publicly known image processing such as white balance processing, Bayer interpolation processing, saturation enhancement, edge enhancement, noise reduction for the image data generated at the step S18 to generate an image worthy of viewing. The image processing section 12 transfers and records the image data to the buffer memory 4.

Step S19: The CPU 5 makes the image data recorded to the buffer memory 4 into a file in JPEG format, YUV format, or the like, records to the card memory 7 via the bus 13 and the card I/F 6, and finishes a series of works.

Next, a method to ask the correction coefficient stored in the correction coefficient storing section 106 is described.

The image sensor 2 built into a product or an image sensor having the same performance as the image sensor 2 is prepared to ask the correction coefficient. Lights in plural kinds of various spectral intensity distributions are irradiated for the image sensor 2 so that light intensities do not change depending on places, and inspection image data are acquired as for the lights in the respective spectral intensity distributions.

Next, an inspection object pixel location is set by performing the same process as the process performed by the correction object pixel setting section 101 to set the correction object pixel location at the step S11. Subsequently, an inspection object pixel value is extracted as same as the process in which the correction object pixel data is extracted at the step S12. The other color pixel value at the inspection object pixel location is asked by performing the similar process as the process extracting the other color pixel value at the step S13. Further, the pixel values of the normal imaging pixels of R, G, B without any error in the color filters existing at positions fully set apart from the AF pixel location are extracted, and these values are set as normal pixel values R", G" and B". These inspection object pixel values, the other color pixel values, and the normal pixel values are extracted from each of the plural inspection image data.

The correction coefficient to be asked is set as a common undetermined coefficient as for the plural inspection image data in accordance with distances from the AF pixel row. For example, the correction coefficients of the imaging pixel of R existing at a distance of one pixel from the AF pixel row are set as "kR1_R, kR1_G and kR1_B", and values "F" asked by the following expression (5) are calculated as for the imaging pixels R43 and R63 of R at both sides of the AF pixel X53 (coordinate (x1, y1)).

$$F=(R''-R(x1,y1+1)-(kR1\_R\times R(x1,y1+1)+kR1\_G\times G(x1,y1+1)+kR1\_B\times B(x1,y1+1)))^2+(R''-R(x1,y1-1)-(kR1\_R\times R(x1,y1-1)+kR1\_G\times G(x1,y1-1)+kR1\_B\times B(x1,y1-1)))^2 \quad (5)$$

Accordingly, the "F" values of the expression (5) are each asked similarly as for all of the imaging pixels of R existing at the coordinates from H1 to H2 in the horizontal scanning direction at the distance of one pixel from the AF pixel row. All of the "F" values asked in the respective inspection image data are integrated. Values of the correction coefficients (kR1_R, kR1_G, kR1_B) making the integrated "F" value minimum are calculated by a least squares method. Specifically, the values can be asked by partially differentiating an expression representing the integrated value with kR1_R, kR1_G or kR1_B, respectively, and by deriving a simultaneous linear equations from a condition in which a partial differential value becomes "0" (zero). The correction coefficients and so on of the imaging pixels of G existing at the distance of one pixel from the AF pixel row are asked similarly.

When the characteristics of the color filters in the vicinity of the AF pixel do not much depend on the locations in the horizontal scanning direction being an arranging direction, an average value of the correction coefficients asked at the respective locations in the horizontal scanning direction or the correction coefficient asked at an appropriate location may be stored to the correction coefficient storing section 106 because the correction coefficient asked as stated above does not much depend on the location in the horizontal scanning direction. On the other hand, when the characteristics of the color filters in the vicinity of the AF pixel largely depend on the location in the horizontal scanning direction, it is necessary to store the correction coefficients in accordance with the respective locations to the correction coefficient storing section 106.

There are cases when the light intensity of a color component which is transmitted through the color filter under normal circumstances goes short, or when a color component which is seldom transmitted under normal circumstances is excessively transmitted if there is an error in the color filter. According to the present embodiment, it is possible to reproduce an output equivalent to a normal pixel value by adjusting shortage and excess of the pixel values by adding a value in which the appropriate correction coefficient is multiplied to the pixel values of each of the imaging pixels of RGB representing the light intensity transmitting through the color filters of RGB to the pixel value of which color filter has the error. The error resulting from the effect of the AF pixel can be corrected by performing the process asking the pixel value at the AF pixel location after the error of the color filter is corrected as stated above.

The case is described when the errors of the color filters in the vicinity of the AF pixel row are corrected in the above-stated embodiment, but the present invention can be applied to an error of a general color filter. For example, when there is an error in a spectral sensitivity because a color filter of a certain pixel is peeled off caused by a defect in a manufacturing process of an image sensor, it is possible to correct an error of an image resulting from the error of the color filter by asking location information of the pixel and a correction coefficient by an inspection, storing each value to the location information storing section 102 and the correction coefficient storing section 106, and performing the process of the present invention for the image photographed by the electronic camera 10 mounting the image sensor.

The image captured by the image sensor 2 having the AF pixels is processed in the present embodiment, but the present invention is not limited to the above. It is possible to apply to an image captured by an image sensor in which the AF pixel is not provided.

In the present embodiment, the arranging direction of the AF pixels is set to be the horizontal scanning direction, but the present invention is not limited to the above The AF pixels may be arranged in the vertical scanning direction or in the other directions.

In the present embodiment, the respective AF pixels are set to be the focus detection pixels pupil splitting the luminous flux from the left side or the right side, but the present invention is not limited to the above. The respective AF pixels may be the focus detection pixels having pixels pupil splitting the luminous flux from the left side and the right side.

In the present embodiment, the area having the error in the spectroscopic characteristic of the color filter of the image sensor 2 is set to be the area of three pixels width in one side centering on the AF pixel row, but the present invention is not limited to the above. The present invention can be applied to an area having a width in an arbitrary size centering on the AF pixel row.

The present invention can be applied to a program enabling the processes in the image processing apparatus according to the present invention on a computer.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described and accordingly all suitable modifications and equivalents may be resorted to, falling within the scope thereof.

The invention claimed is:

1. An image processing apparatus, comprising:
    a location information storing section storing location information of an imaging pixel having a trouble in a color filter among a plurality of imaging pixels of an image sensor in which the imaging pixels are two-dimensionally arranged and have color filters in a plurality of colors;
    a correction coefficient storing section storing a correction coefficient which corrects a pixel value of the imaging pixel having the trouble;
    a correction object pixel location setting section setting a location of a correction object pixel by using the location information;
    a correction object pixel data extracting section extracting a pixel value of the correction object pixel;
    an other-color pixel data extracting section extracting an other-color pixel value whose color is different from the color of the color filter at the location of the correction object pixel, by using a pixel value of an imaging pixel which exists in a vicinity of the correction object pixel and has a color filter whose color is different from the color of the color filter of the correction object pixel; and
    a pixel data correcting section correcting the pixel value of the correction object pixel by calculating a weighted sum of the pixel value of the correction object pixel and the other-color pixel value by using the correction coefficient.

2. The image processing apparatus according to claim 1, wherein
    an area of the image sensor includes a part being a focus detection pixel whose spectroscopic characteristic is different from the spectroscopic characteristic of the imaging pixel,
    the location information storing section stores location information of the focus detection pixel,
    the correction coefficient stored in the correction coefficient storing section is a coefficient in accordance with a distance from the focus detection pixel, and
    the correction object pixel location setting section sets locations of imaging pixels in a vicinity of the focus detection pixel as the location of the correction object pixel.

3. The image processing apparatus according to claim 2, further comprising
    an imaging pixel data estimating section interpolating a pixel value for imaging at the location of the focus detection pixel by using the pixel value of the correction object pixel corrected by the pixel data correcting section.

4. An imaging apparatus, comprising:
    an image sensor; and
    the image processing apparatus according to claim 1.

5. A correction coefficient calculation method calculating the correction coefficient stored in the correction coefficient storing section of the image processing apparatus according to claim 1, comprising:
    an inspection image generating operation generating a plurality of inspection images by irradiating a plurality of inspection lights to the image sensor, the inspection lights having different spectroscopic characteristics;
    an inspection object pixel location setting operation setting a location of the imaging pixel having the trouble as a location of an inspection object pixel;
    an inspection object pixel data extracting operation extracting a pixel value of the imaging pixel having the trouble as an inspection object pixel value;
    an other-color pixel data extracting operation extracting an other-color pixel value whose color is different from the color of the color filter at the location of the correction object pixel, by using a pixel value of an imaging pixel which exists in a vicinity of the location of the inspection object pixel and whose color is different from the color of the color filter of the inspection object pixel;
    a normal pixel data generating operation extracting a pixel value of an imaging pixel as a normal pixel value, the imaging pixel having the color filter of the same color as the inspection object pixel and of which color filter is normal; and
    a weighted coefficient generating operation calculating a weighted coefficient approximating to the normal pixel value as a coefficient common to the plurality of inspection images by calculating a weighted sum of the inspection object pixel value and the other-color pixel value.

6. A computer readable non-transitory storage medium that stores an image processing program causing a computer to execute processes of the image processing apparatus according to claim 1.

7. An imaging apparatus, comprising:
    an image sensor; and
    the image processing apparatus according to claim 2.

8. An imaging apparatus, comprising:
    an image sensor; and
    the image processing apparatus according to claim 3.

9. A correction coefficient calculation method calculating the correction coefficient stored in the correction coefficient storing section of the image processing apparatus according to claim 2, comprising:
    an inspection image generating operation generating a plurality of inspection images by irradiating a plurality of inspection lights to the image sensor, the inspection lights having different spectroscopic characteristics;
    an inspection object pixel location setting operation setting a location of the imaging pixel having the trouble as a location of an inspection object pixel;

an inspection object pixel data extracting operation extracting a pixel value of the imaging pixel having the trouble as an inspection object pixel value;

an other color pixel data extracting operation extracting an other color pixel value whose color is different from the color of the color filter at the location of the correction object pixel, by using a pixel value of an imaging pixel which exists in a vicinity of the location of the inspection object pixel and has a color filter whose color is different from the color of the color filter of the inspection object pixel;

a normal pixel data generating operation extracting a pixel value of an imaging pixel as a normal pixel value, the imaging pixel having the color filter of the same color as the inspection object pixel and of which color filter is normal; and a weighted coefficient generating operation calculating a weighted coefficient approximating to the normal pixel value as a coefficient common to the plurality of inspection images by calculating a weighted sum of the inspection object pixel value and the other color pixel value.

10. A correction coefficient calculation method calculating the correction coefficient stored in the correction coefficient storing section of the image processing apparatus according to claim 3, comprising:

an inspection image generating operation generating a plurality of inspection images by irradiating a plurality of inspection lights to the image sensor, the inspection lights having different spectroscopic characteristics;

an inspection object pixel location setting operation setting a location of the imaging pixel having the trouble as a location of an inspection object pixel;

an inspection object pixel data extracting operation extracting a pixel value of the imaging pixel having the trouble as an inspection object pixel value;

an other color pixel data extracting operation extracting an other color pixel value whose color is different from the color of the color filter at the location of the correction object pixel, by using a pixel value of an imaging pixel which exists in a vicinity of the location of the inspection object pixel and has a color filter whose color is different from the color of the color filter of the inspection object pixel;

a normal pixel data generating operation extracting a pixel value of an imaging pixel as a normal pixel value, the imaging pixel having the color filter of the same color as the inspection object pixel and of which color filter is normal; and a weighted coefficient generating operation calculating a weighted coefficient approximating to the normal pixel value as a coefficient common to the plurality of inspection images by calculating a weighted sum of the inspection object pixel value and the other color pixel value.

11. A computer readable non-transitory storage medium that stores an image processing program causing a computer to execute processes of the image processing apparatus according to claim 2.

12. A computer readable non-transitory storage medium that stores an image processing program causing a computer to execute processes of the image processing apparatus according to claim 3.

\* \* \* \* \*